(12) United States Patent
Hasegawa (10) Patent No.: US 9,721,179 B2
(45) Date of Patent: Aug. 1, 2017

(54) LINE SEGMENT AND ARC DETECTION APPARATUS

(71) Applicant: MegaChips Corporation, Osaka (JP)

(72) Inventor: Hiromu Hasegawa, Osaka (JP)

(73) Assignee: MegaChips Corporation, Osaka (JP)

( * ) Notice: Subject to any disclaimer, the term of this patent is extended or adjusted under 35 U.S.C. 154(b) by 0 days.

(21) Appl. No.: 15/220,167

(22) Filed: Jul. 26, 2016

(65) Prior Publication Data

US 2016/0335517 A1 Nov. 17, 2016

Related U.S. Application Data

(62) Division of application No. 14/240,912, filed as application No. PCT/JP2012/068439 on Jul. 20, 2012, now Pat. No. 9,443,318.

(30) Foreign Application Priority Data

Aug. 30, 2011 (JP) .................................. 2011-186957
Sep. 21, 2011 (JP) .................................. 2011-206004

(51) Int. Cl.
*G06K 9/18* (2006.01)
*G06K 9/46* (2006.01)
(Continued)

(52) U.S. Cl.
CPC ......... *G06K 9/4633* (2013.01); *G06K 9/4652* (2013.01); *G06T 7/13* (2017.01);
(Continued)

(58) Field of Classification Search
None
See application file for complete search history.

(56) References Cited

U.S. PATENT DOCUMENTS 5,054,098 A 10/1991 Lee
5,638,465 A 6/1997 Sano et al.
(Continued)

FOREIGN PATENT DOCUMENTS

JP 8 69533 3/1996
JP 8-171635 A 7/1996
(Continued)

OTHER PUBLICATIONS

Hansen, Klaus; Andersen, Jens Damgaard, Understanding the Hough transform: Hough cell support and its utilization, Image and Vision Computing, vol. 15, No. 3, 1997, p. 205-218.*
(Continued)

*Primary Examiner* — Andrae S Allison
(74) *Attorney, Agent, or Firm* — Oblon, McClelland, Maier & Neustadt, L.L.P.

(57) ABSTRACT

An apparatus and method to detect a line segment or arc using Hough transform. A Hough transform unit performs contour extraction on brightness image data to generate contour image data, with pixels having a pixel value of 0 to 255, performs the Hough transform on points in the contour image data, and counts additional values represented by pixel values of points in the contour image data in a Hough table. The Hough transform unit performs contour extraction on first to third component data to generate first to third contour data with pixels having a pixel value of 0 to 255, performs the Hough transform on points in the first to third contour data, and counts additional values represented by pixel values of points in the first to third contour data in the Hough table. The detection unit comprehensively evaluates the counts to detect a line segment or arc.

13 Claims, 6 Drawing Sheets

(51) Int. Cl.
*G06T 7/13* (2017.01)
*G06T 7/168* (2017.01)

(52) U.S. Cl.
CPC .... *G06T 7/168* (2017.01); *G06T 2207/10024* (2013.01); *G06T 2207/20061* (2013.01)

(56) References Cited

U.S. PATENT DOCUMENTS

| | | | |
|---|---|---|---|
| 6,157,737 A | | 12/2000 | Ishikawa et al. |
| 6,826,311 B2* | | 11/2004 | Wilt ............... G06K 9/4633 345/418 |
| 7,406,212 B2* | | 7/2008 | Mohamed ......... G06K 9/4633 382/248 |
| 8,150,207 B2* | | 4/2012 | Li .................. G06K 9/4633 382/281 |
| 8,861,822 B2* | | 10/2014 | Pagoulatos ........ A61B 8/0841 382/131 |
| 9,053,389 B2* | | 6/2015 | Poyil ............... G06K 9/00818 |
| 9,443,318 B2* | | 9/2016 | Hasegawa ......... G06K 9/4633 |
| 2003/0063097 A1 | | 4/2003 | Prabhakar et al. |
| 2004/0005081 A1 | | 1/2004 | Arcas-Luque et al. |
| 2005/0219581 A1 | | 10/2005 | Dobashi |
| 2007/0177818 A1 | | 8/2007 | Teshima et al. |
| 2008/0012860 A1 | | 1/2008 | Klefenz et al. |
| 2009/0080704 A1 | | 3/2009 | Mori et al. |
| 2009/0304285 A1* | | 12/2009 | Wu ................. G06K 9/4633 382/199 |
| 2010/0232639 A1 | | 9/2010 | Ibrahim et al. |
| 2013/0022280 A1 | | 1/2013 | Liu et al. |
| 2014/0063244 A1 | | 3/2014 | Saha et al. |
| 2014/0153834 A1 | | 6/2014 | Poyil et al. |
| 2014/0161349 A1 | | 6/2014 | Hasegawa |

FOREIGN PATENT DOCUMENTS

| | | |
|---|---|---|
| JP | 9 251544 | 9/1997 |
| JP | 10 283476 | 10/1998 |
| JP | 11 68302 | 3/1999 |
| JP | 2005 285006 | 10/2005 |
| JP | 2006 107034 | 4/2006 |
| JP | 2008-123036 | 5/2008 |
| JP | 2010 134535 | 8/2010 |
| JP | 2011 2919 | 1/2011 |
| JP | 2011-097251 A | 5/2011 |
| WO | 2007 000911 | 1/2007 |

OTHER PUBLICATIONS

F. Lalys*, L. Riffaud, D. Bouget, and P. Janni, A Framework for the Recognition of High-Level Surgical Tasks From Video Images for Cataract Surgeries, IEEE Transactions on Biomedical Engineering, vol. 59, No. 4, Dec. 23, 2011.*
Stylianidis et al, Using Hough Transform in Line Extraction, International Archives of Photogrammetry and Remote Sensing. vol. XXXIII, Supplement B5. Amsterdam 2000.*
International Search Report Issued Aug. 28, 2012 in PCT/JP12/068439 Filed Jul. 20, 2012.
Office Action issued Oct. 27, 2015 in Japanese Patent Application No. 2011-186957 (with English language translation).
Office Action issued Oct. 27, 2015 in Japanese Patent Application No. 2011-206004 (with English language translation).
Daisuke Ishii, et al., "A Study on Control Parameters of Frame Separation Method for Comic Images", IEICE technical report, The Institute of Electronics, Information and Communication Engineers, May 21, 2009, Vol.109, No. 65, p. 187-192.
Japanese Office Action mailed Apr. 12, 2016 in Japanese Patent Application No. 2011-186957 with translation.
Japanese Office Action mailed Apr. 12, 2016 in Japanese Patent Application No. 2011-206004 with translation.
Hansen, Klaus: Andersen, Jens Damgaard, Understanding the Hough transform: Hough cell support and its utilization, Image and Vision Computing, vol. 15, No. 3, 1997, p. 205-218.
F. Lalys, L. Riffaud, D. Bouget, and P. Janni, A Framework for the Recognition of High-Level Surgical Tasks From Video Images for Cataract Surgeries, IEEE Transactions on Biomedical Engineering, vol. 59, No. 4, Apr. 2012.
Stylianidis et al, Using Hough Transform in Line Extraction, International Archives of Photogrammetry and Remote Sensing, vol. XXXIII, Supplement B5, Amsterdam 2000.
Japanese Office Action issued Nov. 1, 2016 in Patent Application No. 2011-186957 with English translation.
Extended European Search Report issued Oct. 7, 2016 in Patent Application No. 12827989.0.
William K. Pratt, "Chapter 17: Image Segmentation", Digital Image Processing: PIKS Inside, Third Edition, 2001, XP055140721, pp. 551-587.
Theo Gevers, et al., "Color Feature Detection", Color Image Processing: Methods and Applications, vol. 9, 2006, XP55306749, 28 pages.
Aida Fooladivanda, et al., "Automatic Segmentation of Pallet Images Using the 2-D Wavelet Transform and YUV Color Space", Electrical Engineering (ICEE), 2010, XP031706863, 6 pages.

* cited by examiner

LINE SEGMENT AND ARC DETECTION APPARATUS

CROSS REFERENCE TO RELATED APPLICATIONS

This application is a divisional of U.S. application Ser. No. 14/240,912, filed on Feb. 25, 2014, which is a national stage of International Application No. PCT/JP12/068439, filed on Jul. 20, 2012, the entire contents of each of which being incorporated herein by reference. The present application is further based upon and claims the benefit of priority from Japanese Patent Application No. 2011-186957 filed on Aug. 30, 2011, and Japanese Patent Application No. 2011-206004 filed on Sep. 21, 2011.

TECHNICAL FIELD

The present invention relates to techniques for detecting a line segment or arc contained in an image.

BACKGROUND ART

The Hough transform may be used to detect a line segment contained in an image. A straight line (x cos θ+y sin θ=ρ) that passes through an arbitrary point in an image with an X-Y coordinate system is converted to coordinates (θ,ρ) in the Hough space. The number of straight lines that can be converted to a particular set of coordinates (θ,ρ) in the Hough space are counted using a two-dimensional array [θ][ρ]. Based on the value sets of coordinates (θ,ρ) with a count larger than a predetermined threshold in the two-dimensional array [θ][ρ], a straight line in the X-Y coordinate system is detected.

An arc $((x-a)^2+(y-b)^2=r^2)$ that passes through an arbitrary point in an image with an X-Y coordinate system is converted to coordinates (a,b,r) in the Hough space. The number of arcs that can be converted to a particular set of coordinates (a,b,r) in the Hough space are counted using a three-dimensional array [a][b][r]. Based on the value sets of coordinates (a,b,r) with a count larger than a predetermined threshold in the three-dimensional array [a][b][r], an arc in the X-Y coordinate system is detected.

In Patent Document 1, specified below, an image is divided into subareas to detect a line segment in the image by using the Hough transform. In Patent Document 2, also specified below, an attempt is made to optimize the sampling interval for the parameters θ and ρ in the Hough space depending on the length of a straight line. In Patent Document 3, specified below, the Hough transform is also used to detect a line segment contained in an image.

PRIOR ART DOCUMENTS

Patent Documents

Patent Document 1: JP Hei10(1998)-283476 A
Patent Document 2: JP Hei11(1999)-66302 A
Patent Document 3: JP 2006-107034 A

SUMMARY OF THE INVENTION

Problems to be Solved by the Invention

The detection of a line segment or arc using the Hough transform depends on the number of points present in an image. Various points present in an image, other than those that actually constitute a line segment or arc. As such, a line segment or the like may be falsely detected when there is strong noise.

Means to Solve the Problems

A detection apparatus for detecting a line segment in a specified image according to the present invention includes: a feature quantity calculating part configured to determine the feature quantity of each point in the specified image; a Hough transform part configured to convert a straight line that passes through an arbitrary point in the specified image to a value set of coordinates (θ,ρ) in a Hough space by representing an arbitrary straight line in the specified image using a length ρ of a perpendicular extending from a reference point of the specified image to the arbitrary straight line in the specified image and an angle θ formed by the perpendicular with a reference axis that passes through the reference point; a counting part configured to add a value weighted by the feature quantity of a point in the specified image in a storage entry corresponding to a value set of coordinates (θ,ρ) in the Hough space to which the point in the specified image is converted by the Hough transform part; and a detection part configured to detect the straight line in the specified image by identifying a value set of coordinates (θ,ρ) for which the count exceeds a first threshold.

A detection apparatus for detecting an arc in a specified image according to the present invention includes: a feature quantity calculating part configured to determine the feature quantity of each point in the specified image; a Hough transform part configured to convert an arc that passes through an arbitrary point in the specified image to a value set of coordinates (a,b,r) in a Hough space by defining orthogonal coordinates with respect to a reference point in the specified image and representing an arbitrary arc in the specified image using a value set of coordinates (a, b) of its center in the orthogonal coordinate system and a radius r; a counting part configured to add a value weighted by the feature quantity of a point in the specified image in a storage entry corresponding to a value set of coordinates (a,b,r) in the Hough space to which the point in the specified image is converted by the Hough transform part; and a detection part configured to detect the arc in the specified image by identifying a value set of coordinates (a,b,r) for which the count exceeds a first threshold.

A detection method for detecting a line segment in a specified image according to the present invention includes: a feature quantity calculating step to determine the feature quantity of each point in the specified image; a Hough transform step to convert a straight line that passes through an arbitrary point in the specified image to a value set of coordinates (θ,ρ) in a Hough space by representing an arbitrary straight line in the specified image using a length ρ of a perpendicular extending from a reference point of the specified image to the arbitrary straight line in the specified image and an angle θ formed by the perpendicular with a reference axis that passes through the reference point; a counting step to add a value weighted by the feature quantity of a point in the specified image in a storage entry corresponding to a value set of coordinates (θ,ρ) in the Hough space to which the point in the specified image is converted by the Hough transform part; and a detection step to detect the straight line in the specified image by identifying a value set of coordinates (θ,ρ) for which the count exceeds a first threshold.

A detection method for detecting an arc in a specified image according to the present invention includes: a feature quantity calculating step to determine the feature quantity of each point in the specified image; a Hough transform step to convert an arc that passes through an arbitrary point in the specified image to a value set of coordinates (a,b,r) in a Hough space by defining orthogonal coordinates with respect to a reference point in the specified image and representing an arbitrary arc in the specified image using a value set of coordinates (a, b) of its center in the orthogonal coordinate system and a radius r; a counting step to add a value weighted by the feature quantity of a point in the specified image in a storage entry corresponding to a value set of coordinates (a,b,r) in the Hough space to which the point in the specified image is converted by the Hough transform part; and a detection step to detect the arc in the specified image by identifying a value set of coordinates (a,b,r) for which the count exceeds a first threshold.

The above detection apparatus of the present invention will reduce effects of noise and allow a line segment or arc contained in an image to be detected accurately.

A detection apparatus for detecting a line segment in a specified image in a color space according to the present invention includes: a generating part configured to generate from the specified image a plurality of component images in the color space; a feature quantity calculating part configured to determine the feature quantity of each point in each component image; a Hough transform part configured to convert a straight line that passes through an arbitrary point in each component image to a value set of coordinates (θ,ρ) in a Hough space by representing an arbitrary straight line in each component image using a length ρ of a perpendicular extending from a reference point of the specified image to the arbitrary straight line in each component image and an angle θ formed by the perpendicular with a reference axis that passes through the reference point; a counting part configured to add a value weighted by the feature quantity of a point in each component image in a storage entry corresponding to a value set of coordinates (θ,ρ) in the Hough space to which the point in each component image is converted by the Hough transform part; a comprehensive counting part configured to comprehensively evaluate the counts for all component images to determine the comprehensive count; and a detection part configured to detect the straight line in the specified image by identifying a value set of coordinates (θ,ρ) for which the comprehensive count exceeds a first threshold.

A detection apparatus for detecting an arc in a specified image in a color space according to the present invention includes: a generating part configured to generate from the specified image a plurality of component images in the color space; a feature quantity calculating part configured to determine the feature quantity of each point in each component image; a Hough transform part configured to convert an arc that passes through an arbitrary point in each component image to a value set of coordinates (a,b,r) in a Hough space by defining orthogonal coordinates with respect to a reference point in each component image and representing an arbitrary arc in each component image using a value set of coordinates (a, b) of its center in the orthogonal coordinate system and a radius r; a counting part configured to add a value weighted by the feature quantity of a point in each component image in a storage entry corresponding to a value set of coordinates (a,b,r) in the Hough space to which the point in each component image is converted by the Hough transform part; a comprehensive counting part configured to comprehensively evaluate the counts for all component images to determine the comprehensive count; and a detection part configured to detect the arc in the specified image by identifying a value set of coordinates (a,b,r) for which the comprehensive count exceeds a first threshold.

A detection method for detecting a line segment in a specified image in a color space according to the present invention includes: a generating step to generate from the specified image a plurality of component images in the color space; a feature quantity calculating step to determine the feature quantity of each point in each component image; a Hough transform step to convert a straight line that passes through an arbitrary point in each component image to a value set of coordinates (θ,ρ) in a Hough space by representing an arbitrary straight line in each component image using a length ρ of a perpendicular extending from a reference point of the component image to the arbitrary straight line in each component image and an angle θ formed by the perpendicular with a reference axis that passes through the reference point; a counting step to add a value weighted by the feature quantity of a point in each component image in a storage entry corresponding to a value set of coordinates (θ,ρ) in the Hough space to which the point in each component image is converted by the Hough transform part; a comprehensive counting step to comprehensively evaluate the counts for all component images to determine the comprehensive count; and a detection step to detect the straight line in the specified image by identifying a value set of coordinates (θ,ρ) for which the comprehensive count exceeds a first threshold.

A detection method for detecting an arc in a specified image in a color space according to the present invention includes: a generating step to generate from the specified image a plurality of component images in the color space; a feature quantity calculating step to determine the feature quantity of each point in each component image; a Hough transform step to convert an arc that passes through an arbitrary point in each component image to a value set of coordinates (a,b,r) in a Hough space by defining orthogonal coordinates with respect to a reference point in each component image and representing an arbitrary arc in each component image using a value set of coordinates (a, b) of its center in the orthogonal coordinate system and a radius r; a counting step to add a value weighted by the feature quantity of a point in each component image in a storage entry corresponding to a value set of coordinates (a,b,r) in the Hough space to which the point in each component image is converted by the Hough transform part; a comprehensive counting step to comprehensively evaluate the counts for all component images to determine the comprehensive count; and a detection step to detect the arc in the specified image by identifying a value set of coordinates (a,b,r) for which the comprehensive count exceeds a first threshold.

The above detection apparatus according to the present invention will allow a line segment or arc contained in an image to be detected accurately after comprehensively evaluating the color components of the image. For example, a line segment with a small difference in brightness but with a change in color may be detected accurately.

An object of the present invention is to provide a technique for detecting a line segment or arc with improved accuracy.

The objects, features, aspects and advantages of the present invention will be made clear by the following detailed description and attached drawings.

EMBODIMENTS FOR CARRYING OUT THE INVENTION

First Embodiment

<1-1. Overall Flow of Process>

Figure 1:
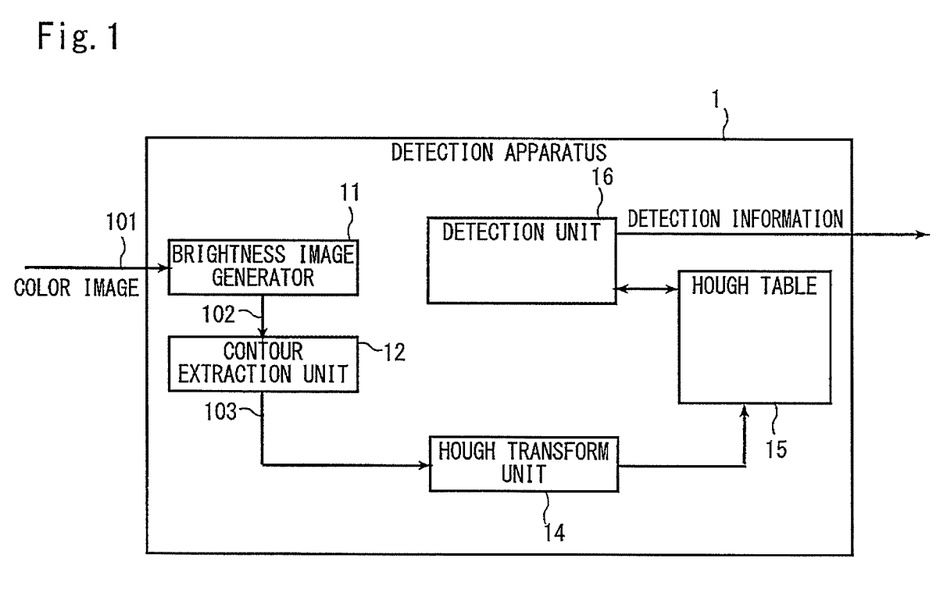
FIG. 1 is a block diagram of a detection apparatus according to a first embodiment.

FIG. 1 is a block diagram of a detection apparatus 1 according to a first embodiment. The detection apparatus 1 includes a brightness image generator 11, contour extraction unit 12, Hough transform unit 14, Hough table 15, and straight line detection unit 16.

The detection apparatus 1 of the present embodiment is capable of detecting a line segment or arc.

In the present embodiment, the brightness image generator 11, contour extraction unit 12, Hough transform unit 14 and detection unit 16 are implemented by hardware circuitry. Alternatively, these functional units may be implemented by a CPU and software running on the CPU.

The brightness image generator 11 receives color image data 101. The color image data 101 may be, for example, an image captured by an imaging device, not shown. The color image data 101 may be, for example, image data of a YCbCr color space or RGB color space. Based on the color image data 101, the brightness image generator 11 generates brightness image data 102. For example, if the color image data 101 is image data of YCbCr color space, the brightness image generator 11 extracts Y signals to generate brightness image data 102.

The contour extraction unit 12 receives the brightness image data 102. Based on the brightness image data 102, the contour extraction unit 12 generates the contour image data 103. In the present embodiment, the contour extraction unit 12 uses a Sobel filter to perform contour extraction. A Sobel filter detects a contour using first space derivation. The contour extraction unit 12 outputs an absolute value of the filter output, which is treated as the contour intensity (i.e. the strength of a line segment or arc). That is, the pixel value of each pixel of contour image data 102 represents a contour intensity. The present embodiment is not limited to a particular filter. For example, a Laplacian filter may be used.

The Hough transform unit 14 receives the contour image data 103. The Hough transform unit 14 performs a Hough transform on the contour image data 103 and writes the result into the Hough table 15. More specifically, to detect a line segment, the Hough transform unit 14 stores the result of a conversion into a two-dimensional array [θ][ρ]. To detect an arc, the Hough transform unit 14 stores the result of a conversion into a three-dimensional array [a][b][r]. The process of the Hough transform will be described in detail further below.

The detection unit 16 refers to the Hough table 15 and detects a line segment or arc contained in the contour image data 103. The process performed by the detection unit 16 will be described in detail further below.

<1-2. Hough Transform (Straight Line)>

The process performed by the Hough transform unit 14 will be described in detail. For an arbitrary point contained in the contour image data 103, the Hough transform unit 14 converts straight lines that pass through that point to coordinates (θ,ρ) in the Hough space.

Figure 2:
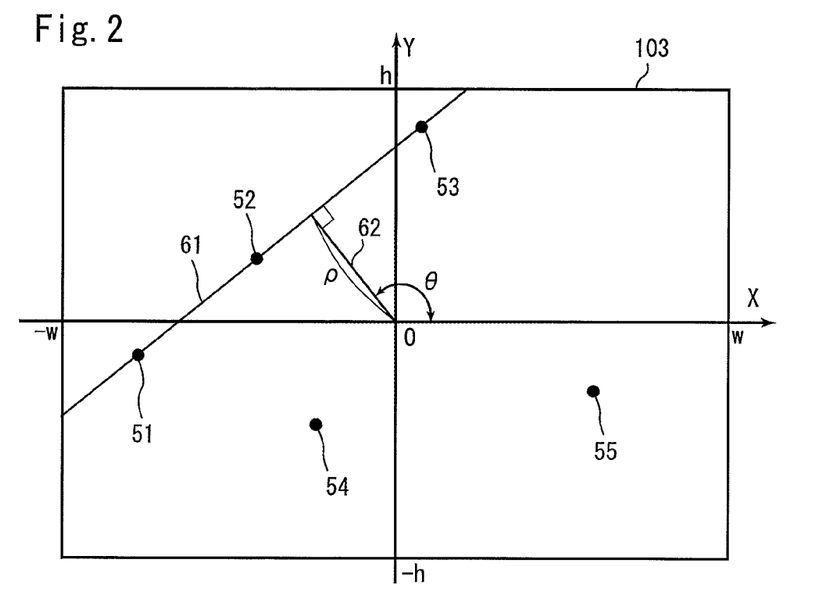
FIG. 2 is a graph illustrating how a straight line can be represented in contour image data.

FIG. 2 is a graph illustrating the contour image data 103. In the contour image data 103, the origin O and X and Y coordinates are defined, as shown in FIG. 2. FIG. 2 shows some of the points contained in the contour image data 103, designated by 51 to 55. Each point contained in the contour image data 103 has a different pixel value. In the present embodiment, a pixel value in the contour image data 103 is in a resolution of 8 bits. That is, each pixel of the contour image data 103 has a pixel value of 0 to 255. In other words, each pixel of the contour image data 103 has information regarding contour intensity represented by any of 0 to 255. The straight line 61 that passes through the point 51 may be expressed in Equation 1, which uses θ and ρ:

[Equation 1]

$$x \cos \theta + y \sin \theta = \rho \tag{1}$$

In Equation 1, ρ is the length of the perpendicular 62 extending from the origin to the straight line 61. θ is the angle formed by the perpendicular 62 with the positive direction of the X-axis.

Multiple straight lines that pass through the point 51 are possible. The number of straight lines that pass through the point 51 depends on the sampling interval of θ and ρ. Accordingly, a plurality of value sets of coordinates (θ,ρ) in the Hough space are associated with one point in the contour image data 103.

As shown in FIG. 2, the points 51 to 53 are arranged on one straight line. Straight lines passing through each of the points 52 and 53 are also converted to a plurality of value sets of coordinates (θ,ρ) in the Hough space. Then, based on all the points 51 to 53, the Hough transform is performed on the straight line 61, which is associated with the same value set of coordinates (θ,ρ).

Figure 3:
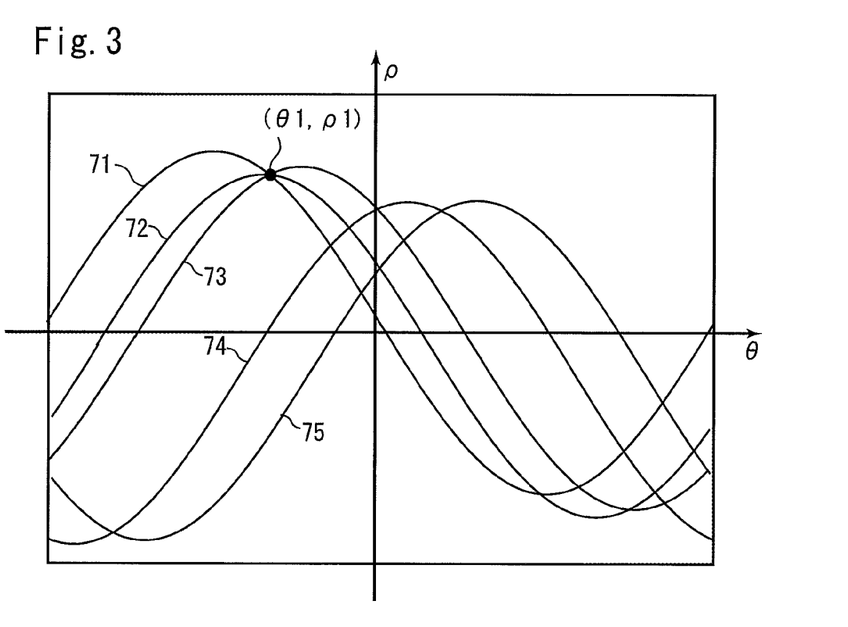
FIG. 3 is a graph illustrating a Hough space.

FIG. 3 is a graph illustrating a Hough space. Each of the sinusoidal curves 71 to 75 represents a collection of the points in the Hough space produced from the Hough transform of the corresponding one of the points 51 to 55. The coordinates (θ1,ρ1) where the sinusoidal curves 71 to 73 intersect correspond to the straight line 61.

Thus, if a plurality of points are present on the same straight line in the contour image data 103, these points in the contour image are converted to the same point in the Hough space. The number of points that can be converted to a particular value set of coordinates (θ,ρ) in the Hough space is counted before the straight line is detected. The Hough table 15 contains a two-dimensional array T[θ][ρ]. That is, the Hough transform is performed on every point of the contour image data 103 and the resulting counts are stored in the two-dimensional array T[θ][ρ].

<1-3. Hough Transform (Arc)>

For an arbitrary point contained in the contour image data 103, the Hough transform unit 14 converts arcs (chords) that pass through that point to coordinates (a,b,r) in the Hough space.

Figure 4:
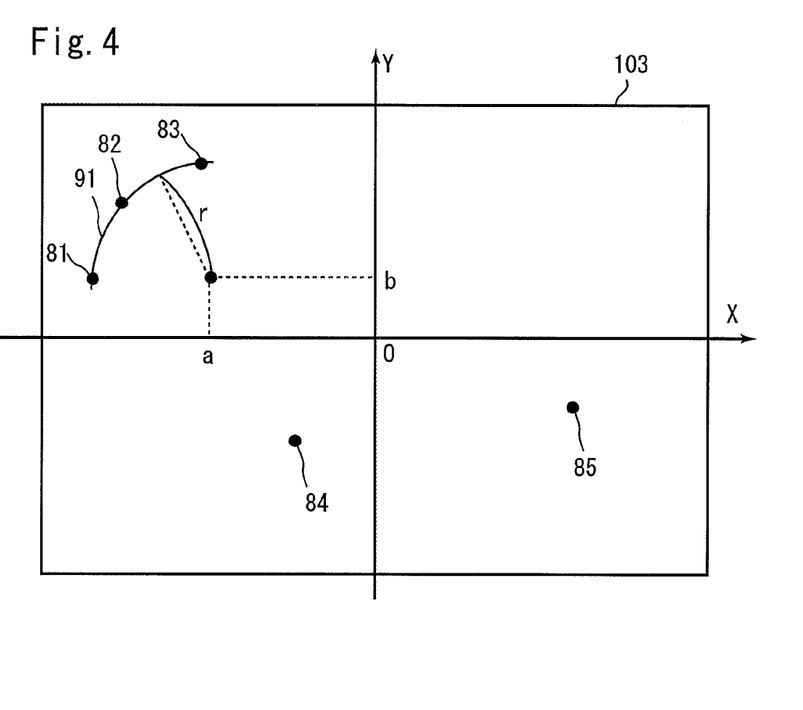
FIG. 4 is a graph illustrating how an arc can be represented in contour image data.

FIG. 4 is a graph illustrating the contour image data 103. In the contour image data 103, the origin O and X and Y coordinates are defined, as shown in FIG. 4. FIG. 4 shows some of the points contained in the contour image data 103, designated by 81 to 85. As discussed above, each point contained in the contour image data 103 has a pixel value of 0 to 255. In other words, each pixel of the contour image data 103 has information regarding contour intensity represented by any of 0 to 255. The arc 91 that passes through the point 81 may be expressed in Equation 2, which uses a, b and r:

[Equation 2]

$$(x-a)^2+(y-b)^2=r^2 \qquad (2)$$

In Equation 2, "a" is the X coordinate of the center of the arc 91, and "b" is the Y coordinate of the center of the arc 91; and "r" is the radius of the arc 91.

Multiple arcs that pass through the point 81 are possible. The number of arcs that pass through the point 81 depends on the sampling interval of a, b and r. Accordingly, a plurality of value sets of coordinates (a, b, r) in the Hough space are associated with one point in the contour image data 103.

As shown in FIG. 4, the points 81 to 83 are arranged on one arc. Arcs passing through each of the points 82 and 83 are also converted to a plurality of value sets of coordinates (a, b, r) in the Hough space. Then, based on all the points 81 to 83, the Hough transform is performed on the arc 91, which is associated with the same value set of coordinates (a,b,r).

Thus, if a plurality of points are present on the same arc in the contour image data 103, these points in the contour image are converted to the same point in the Hough space. The number of points that can be converted to a particular value set of coordinates (a,b,r) in the Hough space is counted before the arc is detected. The Hough table 15 contains a three-dimensional array T[a][b][r]. That is, the Hough transform is performed on every point of the contour image data 103 and the resulting counts are stored in the three-dimensional array T[a][b][r].

<1-4. Counting>

A process for counting performed by the Hough transform unit 14 will be described. As discussed above, each pixel of contour image data 103 has a pixel value of 0 to 255. When a point in the contour image data 103 is converted to a value set of coordinates (θ,ρ) in the Hough space, the Hough transform unit 14 adds the pixel value of the point in the contour image data 103 to the counts in the two-dimensional array T[θ][ρ]. In other words, values of the contour intensities of the points in the contour image data 103 are added to the counts in the two-dimensional array T[θ][ρ].

For example, if a pixel with a pixel value of 10 is converted to a value set of coordinates (θ,ρ) in the Hough space, 10 is added to the counts in the corresponding two-dimensional array T[θ][ρ]. For a pixel value of 255, 255 is added to the counts. Thus, the counts for detecting a straight line can be obtained after weighting depending on the contour intensity.

A point with a pixel value of 0 is not recognized as a point in the contour image data 103. As such, the Hough transform need not be performed on points with a pixel value of 0 contained in the contour image data 103. A value of 1 to 255 added to the counts in the two-dimensional array T[θ][ρ]. However, in theory, a broader understanding that 0 is added to the counts in the two-dimensional array T[θ][ρ] for points with a pixel value of 0 contained in the contour image data 103 is possible.

Similarly, when a point in contour image data 103 is converted to a value set of coordinates (a,b,r) in the Hough space, the Hough transform unit 14 adds the pixel value of the point in the contour image data 103 to the counts in the three-dimensional array T[a][b][r]. That is, a value of 1 to 255 is added to the counts in the three-dimensional array T[a][b][r]. In other words, the value of contour intensity of a point in the contour image data 103 is added to the counts in the three-dimensional array T[a][b][r].

<1-5. Line Segment or Arc Detection>

The detection unit 16 refers to the Hough table 15 and detects a line segment or arc contained in the contour image data 103. The detection unit 16 refers to the counts in the two-dimensional array T[θ][ρ] stored in the Hough table 15 and detects a line segment. Or, the detection unit 16 refers to the counts in the three-dimensional array T[a][b][r] stored in the Hough table 15 and detects an arc.

The detection unit 16 stores in advance a threshold for detecting a straight line or a threshold for detecting an arc. The detection unit 16 refers to the two-dimensional array T[θ][ρ] and detects a value set of coordinates (θ,ρ) with a count that exceeds the threshold for detecting a straight line. Or, the detection unit 16 refers to the three-dimensional array T[a][b][r] and detects a value set of coordinates (a,b,r) with a count that exceeds the threshold for detecting an arc. Based on these detected coordinates, the detection unit 16 detects a line segment or arc. The detection unit 16 outputs detection information regarding the line segment or arc.

Figure 5:
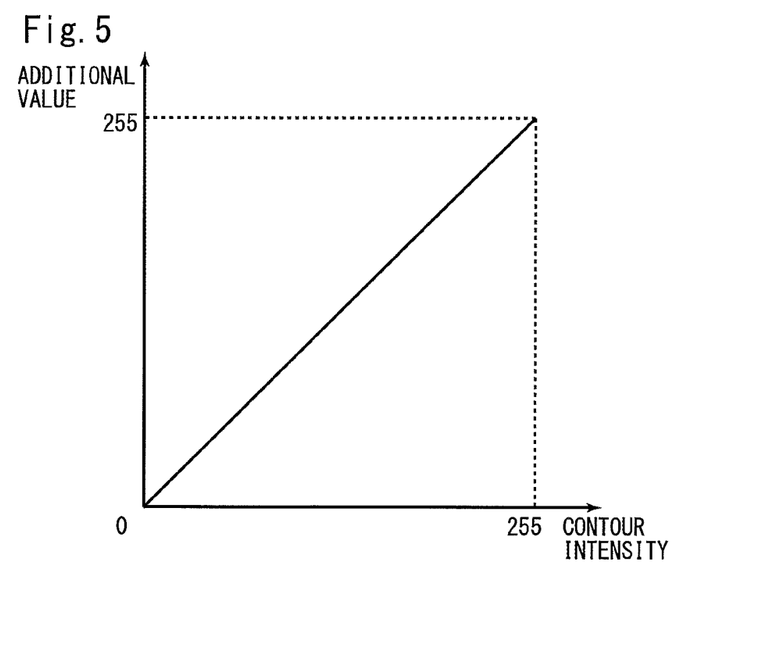
FIG. 5 is a graph of the additional value relative to the pixel value (contour intensity).

FIG. 5 is a graph of the contour intensity of a pixel in the contour image data 103 relative to the additional value. Thus, in the present embodiment, the contour intensity, which is the pixel value of a pixel, is added to the counts in the Hough table 15 without modifications. For a point with a small contour intensity, the contribution to detection of a line segment or arc may be estimated to be low. For a point with a large contour intensity, the contribution to detection of a line segment or arc is estimated to be high, thereby eliminating effects of noise or the like and allowing a line segment or arc to be detected with improved accuracy.

Second Embodiment

Next, a second embodiment of the present invention will be described. The configuration of a detection apparatus 1 of the second embodiment is the same as that shown in FIG. 1. The second embodiment is different from the first embodiment in how counts are provided by the Hough transform unit 14. In the first embodiment, the Hough transform unit 14 adds the contour intensity of a pixel of contour image data 103 to the counts in the Hough table 15 without modifications. In other words, the Hough transform unit 14 adds the pixel value of a pixel in the contour image data 103 to the counts in the Hough table 15 with its resolution maintained.

In the second embodiment, the Hough transform unit 14 adds the contour intensity of a pixel in the contour image data 103 to the counts in the Hough table 15 after quantizing it with a resolution lower than the resolution of the pixel value.

Figure 6:
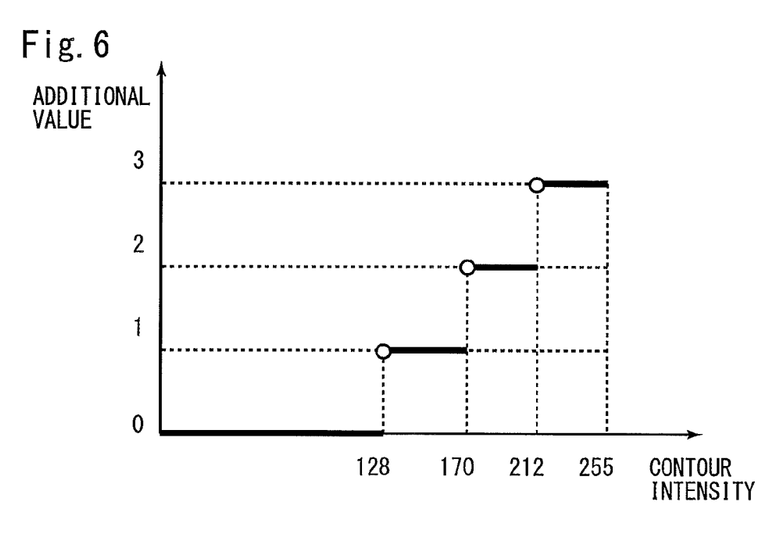
FIG. 6 is a graph of the additional value relative to the pixel value (contour intensity) according to a second and fifth embodiments.

FIG. 6 is a graph of the contour intensity of a pixel relative to the additional value according to the second embodiment. In this implementation, due to quantization, the contour intensities of pixels in the contour image data 103 are associated with four additional values.

More specifically, the pixel values of pixels in contour image data 103 of 128 or less are associated with the additional value of 0. The pixel values of the pixels in the contour image data 103 not less than 129 and not more than 170 are associated with the additional value of 1. The pixel values of the pixels in the contour image data 103 of not less than 171 and not more than 212 are associated with the additional value of 2. The pixel values of the pixels in the contour image data 103 not less than 213 and not more than 255 are associated with the additional value of 3.

Thus, in the present embodiment, the Hough transform unit 14 adds a value of 1 to 3 to the counts in the Hough table 15 depending on the contour intensity of a pixel in the contour image data 103. The process by the detection unit 16 is the same as that for the first embodiment. That is, the detection unit 16 stores in advance a threshold for detecting a straight line or a threshold for detecting an arc. As compared with the first embodiment, the additional value is quantized and thus the threshold may be set depending on the degree of quantization. The detection unit 16 refers to the two-dimensional array T[θ][ρ] or three-dimensional array T[a][b][r] and detects a value set of coordinates with a count that exceeds the threshold for detecting a straight line or arc. Based on these detected coordinates, the detection unit 16 detects a line segment or arc. Thus, a straight line or arc can be detected after weighting depending on the value of contour intensity. Further, compared with the first embodiment, the range of counts may be reduced to reduce the amount of computation.

In the implementation shown in FIG. 6, the additional value of 0 is assigned to the pixel values of 0 to 128, which means that a relatively large range compared with the entire range of pixel values is associated with the additional value of 0. This arrangement is intended to consider a point with a pixel value smaller than the half the maximum to be noise and does not consider it when detecting a line segment or arc. However, any manner of association may be used; for example, any range of pixel values may be assigned to any additional value. In the implementation of FIG. 6, pixel values are assigned to four additional values, i.e. 0 to 3, however, any number of additional values may be used. For example, if only a very sharp line segment or arc is to be detected to minimize effects of noise, the additional value of 0 may be assigned to the pixel values of 0 to 200 and the additional value of 1 may only be assigned to the pixel values of 201 or larger.

Applying a process for detecting a line segment or arc according to the conventional Hough transform to embodiments of the present application would mean that the additional value of 0 is assigned to the pixel value of 0 and the additional value of 1 is assigned to the pixel values of 1 to 255. Conventional processes are susceptible to effects of noise since points of all densities are equally evaluated when the counts in the Hough table are provided. In contrast, in the present embodiment, the additional value is weighted depending on the density even for a pixel value in the range of 1 to 255. This makes it possible to reduce effects of noise and detect a line segment or arc with improved accuracy.

Third Embodiment

<2-1. Overall Flow of Process>

Figure 7:
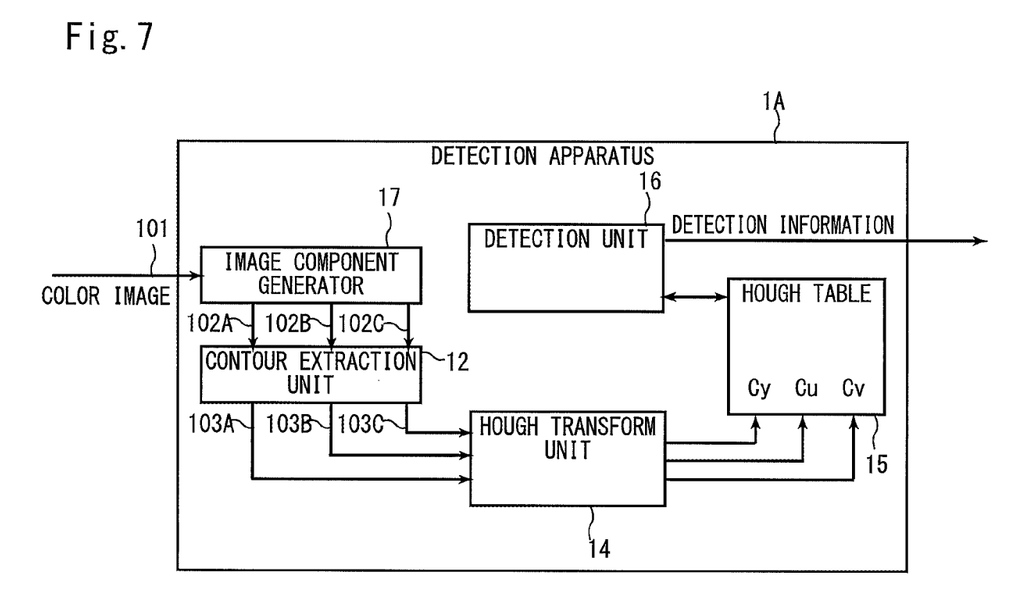
FIG. 7 is a block diagram of a detection apparatus according to a third embodiment.

FIG. 7 is a block diagram of a detection apparatus 1A according to a third embodiment. The detection apparatus 1A includes an component image generator 17, contour extraction unit 12, Hough transform unit 14, Hough table 15, and detection unit 16.

The detection apparatus 1A of the present embodiment is capable of detecting a line segment or arc.

In the present embodiment, the component image generator 17, contour extraction unit 12, Hough transform unit 14 and detection unit 16 are implemented by hardware circuitry. Alternatively, these functional units may be implemented by a CPU and software running on the CPU.

The component image generator 17 receives color image data 101. The color image data 101 may be, for example, an image captured by an imaging device, not shown. The color image data 101 may be, for example, image data of a YUV color space, YCbCr color space or RGB color space. Based on the color image data 101, the component image generator 17 generates first component data 102A, second component data 102B and third component data 102C.

For example, if the color image data 101 is image data of a YUV color space, the component image generator 17 extracts Y signals to generate first component data 102A. Further, the component image generator 17 extracts U signals to generate second component data 102B. The component image generator 17 extracts V signals to generate third component data 102C.

In other implementations where the color image data 101 is image data of an RGB color space, the component image generator 17 extracts G signals to generate first component data 102A. The component image generator 17 extracts R or B signals to generate second or third component data 102B or 102C.

In still other implementations, the component image generator 17 may generate component images after conversion of color space. For example, upon receiving color image data 101 of an RGB color space, the component image generator 17 may convert the color image data 101 to image data of a YUV color space and then generate first to third component data 102A to 102C.

In the description below, as an example, the color image data 101 is image data of a YUV color space and the first component data 102A is image data of Y signals (brightness signals), the second component data 102B is image data of U signals (color-difference signals) and the third component data 102C is image data of V signals (color-difference signals).

The contour extraction unit 12 receives first to third component data 102A to 102C. Based on the first component data 102A, the contour extraction unit 12 generates first contour data 103A. Based on the second component data 102B, the contour extraction unit 12 generates second contour data 103B. Based on the third component data 102C, the contour extraction unit 12 generates third contour data 103C.

That is, the first contour data 103A is contour extraction data derived from Y signals. The second and third contour data 103B and 103C are contour extraction data derived from U and V signals, respectively. Thus, in the present embodiment, different sets of contour extraction data are generated for brightness data and color component data.

In the present embodiment, the contour extraction unit 12 uses a Sobel filter to perform contour extraction. A Sobel filter detects a contour using first space derivation. The contour extraction unit 12 outputs an absolute value of the filter output, which is treated as the contour intensity (i.e. the strength of a line segment or arc). That is, the pixel value of each pixel of first to third contour data 103A to 103C represents a contour intensity. The present embodiment is not limited to a particular filter. For example, a Laplacian filter may be used.

The Hough transform unit 14 receives the first to third contour data 103A to 103C. The Hough transform unit 14 performs a Hough transform on the first to third contour data 103A to 103C and writes the result into the Hough table 15. More specifically, to detect a line segment, the Hough transform unit 14 stores the result of a conversion into a two-dimensional array [θ][ρ]. To detect an arc, the Hough transform unit 14 stores the result of a conversion into a three-dimensional array [a][b][r].

The detection unit 16 refers to the Hough table 15 and detects a line segment or arc contained in the first to third contour data 103A to 103C. The process performed by the detection unit 16 will be described in detail further below.

<2-2. Hough Transform (Straight Line)>

For an arbitrary point contained in the first to third contour data 103A to 103C, the Hough transform unit 14 converts straight lines that pass through that point to coordinates (θ,ρ) in the Hough space. That is, the Hough transform unit 14 separately performs the Hough transform on first to third contour data 103A to 103C. Details of the Hough transform are the same as those of the first embodiment and their description will not be repeated.

As discussed above, the Hough transform is separately performed on the first to third contour data 103A to 103C. In view of this, to detect a line segment, the Hough table 15 has three two-dimensional arrays T[θ][ρ] corresponding to the first to third contour data 103A to 103C.

The first two-dimensional array T[θ][ρ] stores counts C1(θ,ρ) of results of the Hough transform of the first contour data 103A. The second two-dimensional array T[θ][ρ] stores counts C2(θ,ρ) of results of the Hough transform of the second contour data 103B. The third two-dimensional array T[θ][ρ] stores counts C3(θ,ρ) of results of the Hough transform of the third contour data 103C.

In the present embodiment, the counts C1 are counts of results of the Hough transform of a brightness image (Y image). The counts C2 are counts of results of the Hough transform of a color image (U image). The counts C3 are counts of results of the Hough transform of a color image (V image).

In the description, as an example, a plurality of arrays are used to correspond to the first to third contour data 103A to 103C. Alternately, as described further below, a single array may be used to provide counts of results of the Hough transform.

<2-3. Hough Transform (Arc)>

For an arbitrary point contained in the first to third contour data 103A to 103C, the Hough transform unit 14 converts arcs (chords) that pass through that point to coordinates (a,b,r) in the Hough space. That is, the Hough transform unit 14 separately performs the Hough transform on first to third contour data 103A to 103C. Details of the Hough transform are the same as those of the first embodiment and their description will not be repeated.

As discussed above, the Hough transform is separately performed on the first to third contour data 103A to 103C. In view of this, to detect an arc, the Hough table 15 has three three-dimensional arrays T[a][b][r] corresponding to the first to third contour data 103A to 103C.

The first three-dimensional array T[a][b][r] stores counts C1(a,b,r) of results of the Hough transform of the first contour data 103A. The second three-dimensional array T[a][b][r] stores counts C2(a,b,r) of results of the Hough transform of the second contour data 103B. The third three-dimensional array T[a][b][r] stores counts C3(a,b,r) of results of the Hough transform of the third contour data 103C.

In the present embodiment, the counts C1 are counts of results of the Hough transform of a brightness image (Y image). The counts C2 are counts of results of the Hough transform of a color image (U image). The counts C3 are counts of results of the Hough transform of a color image (V image).

In the description, as an example, a plurality of arrays are used to correspond to the first to third contour data 103A to 103C. Alternately, as described further below, a single array may be used to provide counts of results of the Hough transform.

<2-4. Counting>

A process for counting performed by the Hough transform unit 14 will be described. Each pixel of first to third contour data 103A to 103C has a pixel value of 0 to 255. When a point in the first to third contour data 103A to 103C is converted to a value set of coordinates (θ,ρ) in the Hough space, the Hough transform unit 14 adds the pixel values of the points in the first to third contour data 103A to 103C to the counts in the two-dimensional array T[θ][ρ]. In other words, values of the contour intensities of the points in the first to third contour data 103A to 103C are added to the counts in the two-dimensional array T[θ][ρ]. Then, the summed values of the contour intensities, i.e. counts C1, C2 and C3, are stored in the first to third two-dimensional arrays T[θ][ρ].

For example, if a pixel with a pixel value of 10 is converted to a value set of coordinates (θ,ρ) in the Hough space, 10 is added to the counts in the corresponding two-dimensional array T[θ][ρ]. For a pixel value of 255, 255 is added to the counts. Thus, the counts for detecting a straight line can be obtained after weighting depending on the contour intensity.

A point with a pixel value of 0 is not recognized as a point in the first to third contour data 103A to 103C. As such, the Hough transform need not be performed on points with a pixel value of 0 contained in the first to third contour data 103A to 103C. A value of 1 to 255 is added to the counts in the two-dimensional array T[θ][ρ]. However, in theory, a broader understanding that 0 is added to the counts in the two-dimensional array T[θ][ρ] for points with a pixel value of 0 contained in the first to third contour data 103A to 103C is possible.

Similarly, when a point in first to third contour data 103A to 103C is converted to a value set of coordinates (a,b,r) in the Hough space, the Hough transform unit 14 adds the pixel value of the point in the contour image data 103A to 103C to the counts in the three-dimensional array T[a][b][r]. That is, a value of 1 to 255 is added to the counts in the three-dimensional array T[a][b][r]. In other words, the value of contour intensity of a point in the contour image data 103A to 103C is added to the counts in the three-dimensional array T[a][b][r]. Then, the summed values of the contour intensities, i.e. counts C1, C2 and C3, are stored in the first to third three-dimensional arrays T[a][b][r].

<2-5. Line Segment or Arc Detection>

The detection unit 16 refers to the Hough table 15 and detects a line segment or arc contained in the color image data 101. The detection unit 16 comprehensively evaluates the three counts C1 to C3 corresponding to the components stored in the Hough table 15 and detects a line segment. Or, the detection unit 16 comprehensively evaluates the three counts C1 to C3 corresponding to the components stored in the Hough table 15 and detects an arc.

The detection unit 16 stores in advance a threshold for detecting a straight line or a threshold for detecting an arc. The detection unit 16 compares a comprehensive count V calculated from the counts C1 to C3 with a threshold for detecting a straight line and detects a value set of coordinates (θ,ρ) with a comprehensive count V exceeding the threshold for detecting a straight line. Or, the detection unit 16 compares a comprehensive count V calculated from the counts C1 to C3 with a threshold for detecting an arc and detects a value set of coordinates (a,b,r) with a comprehensive count V exceeding the threshold for detecting an arc.

More specifically, the detection unit 16 performs the operation shown in Equation 3 to calculate the comprehensive count V. In Equation 3, C1(θ,ρ) is the count for a pixel of a point with a value set of coordinates (θ,ρ) to which the point in the first contour data 103A has been converted as a result of the Hough transform thereof. In Equation 3, C2(θ, ρ) is the count for a pixel of a point with a value set of coordinates (θ,ρ) to which the point in the second contour 103B has been converted as a result of the Hough transform thereof. In Equation 3, C3(θ,ρ) is the count for a pixel of a point with a value set of coordinates (θ,ρ) to which the point in the third contour data 103C has been converted as a result of the Hough transform thereof.

[Equation 3]

$$V = \frac{1}{3}(C1(\theta, \rho) + C2(\theta, \rho) + C3(\theta, \rho)) \quad (3)$$

For an arc, the detection unit 16 performs the operation shown in Equation 4 to calculate the comprehensive count V. In Equation 4, C1(a,b,r) is the count for a pixel of a point with a value set of coordinates (a,b,r) to which the point in the first contour data 103A has been converted as a result of the Hough transform thereof. In Equation 4, C2(a,b,r) is the count for a pixel of a point with a value set of coordinates (a,b,r) to which the point in the second contour data 103B has been converted as a result of the Hough transform thereof. In Equation 4, C3(a,b,r) is the count for a pixel of a point with a value set of coordinates (a,b,r) to which the point in the third contour data 103C has been converted as a result of the Hough transform thereof.

[Equation 4]

$$V = \frac{1}{3}(C1(a, b, r) + C2(a, b, r) + C3(a, b, r)) \quad (4)$$

The comprehensive count V may be determined by summing C1, C2 and C3 and then dividing it by 3. That is, the comprehensive count V is the average of C1, C2 and C3. The detection unit 16 compares the comprehensive count V with a threshold for detecting a straight line, and detects a line segment. Or, it compares the comprehensive count V with a threshold for detecting an arc, and detects an arc. The detection unit 16 outputs detection information regarding the line segment or arc.

Thus, in the present embodiment, the Hough transform is performed not only on a brightness image but also on a color-difference image, and the results are comprehensively evaluated to detect a line segment or arc. This makes it possible to accurately detect a line segment or arc with a small change in brightness but with a change in color.

In the following description, the first to third contour data 103A to 103C are collectively called contour image data 103, when necessary. FIG. 5 is a graph of the additional value relative to the contour intensity of a pixel in the contour image data 103. Thus, in the present embodiment, the contour intensity, which is the pixel value of a pixel, is added to the counts in the Hough table 15 without modifications. For a point with a small contour intensity, the contribution to detection of a line segment or arc may be estimated to be low. For a point with a large contour intensity, the contribution to detection of a line segment or arc is estimated to be high, thereby eliminating effects of noise or the like and allowing a line segment or arc to be detected with improved accuracy.

In the present embodiment, the counts C1, C2 and C3 that are stored are pixel values of the contour image data 103 without modifications; then, the detection unit 16 sums the counts and calculates their average. In other implementations, the Hough table 15 may have a single array and the pixel values may be stored in this single array. In such implementations, the detection unit 16 only has to divide the counts by 3. In still other implementations, the Hough table 15 may have a single array and the pixel values divided by 3 may be stored in this single array. In such implementations, the detection unit 16 only has to compare such values with a threshold.

Fourth Embodiment

Next, a fourth embodiment of the present invention will be described. The configuration of a detection apparatus 1A according to the fourth embodiment is the same as that shown in FIG. 7. The fourth embodiment is different from the third embodiment in how counts are provided by the detection unit 16.

The detection unit 16 of the fourth embodiment performs the operation shown in Equation 5 to calculate a comprehensive count V. C1(θ,ρ), C2(θ,ρ) and C3(θ,ρ) in Equation 5 are the same as those of the third embodiment. In Equation 5, k1 is a weighting value by which the count C1(θ,ρ) is multiplied, k2 a weighting value by which the count C2(θ,ρ) is multiplied, and k3 a weighting value by which the count C3(θ,ρ) is multiplied. The three weighting values satisfy the relationship k1+k2+k3=1.

[Equation 5]

$$V = k1*C1(\theta,\rho) + k2*C2(\theta,\rho) + k3*C3(\theta,\rho) \quad (5)$$

For an arc, the detection unit 16 performs the operation shown in Equation 6 to calculate the comprehensive count V. C1(a,b,r), C2(a,b,r) and C3(a,b,r) in Equation 6 are the same as those of the third embodiment. In Equation 6, k1 is a weighting value by which the count C1(a,b,r) is multiplied, k2 a weighting value by which the count C2(a,b,r) is multiplied, and k3 a weighting value by which the count C3(a,b,r) is multiplied. The three weighting values satisfy the relationship k1+k2+k3=1.

[Equation 6]

$$V = k1*C1(a,b,r) + k2*C2(a,b,r) + k3*C3(a,b,r) \quad (6)$$

The comprehensive count V may be determined by summing the weighted counts C1, C2 and C3. The detection unit 16 compares the comprehensive count V with a threshold for detecting a straight line, and detects a line segment. Or, it compares the comprehensive count V with a threshold for detecting an arc, and detects an arc. The detection unit 16 outputs detection information regarding the line segment or arc.

Thus, the Hough transform is performed not only on a brightness image but also on a color-difference image, and the results are comprehensively evaluated to detect a line segment or arc. Moreover, the counts are multiplied by a weighting value, making it possible to detect a line segment or arc while focusing an a particular color component.

In the present embodiment, pixel values of the contour image data 103, i.e. counts C1, C2 and C3, are stored in the Hough table 15 without modifications; then, the detection unit 16 multiplies the counts by a weighting value and sums them up. In other implementations, the Hough table 15 may store the pixel values multiplied by a weighting value. In such implementations, the detection unit 16 only has to sums the counts. In still other implementations, the Hough table 15 may have a single array and the weighted values may be stored in this single array. In such implementations, the detection unit 16 only has to compare such values with a threshold.

Fifth Embodiment

Next, a fifth embodiment of the present invention will be described. The configuration of a detection apparatus 1A according to the fifth embodiment is the same as that shown in FIG. 7. The fifth embodiment is different from the third or fourth embodiment in how counts are stored in the Hough table 15 and how counts are provided by the detection unit 16. In the third or fourth embodiment, the Hough transform unit 14 adds the contour intensity of a pixel in the contour image data 103 to the counts in the Hough table 15 without modifications. In other words, the Hough transform unit 14 adds the pixel value of a pixel in the contour image data 103 to the counts in the Hough table 15 while maintaining the resolution of the pixel value.

In the fifth embodiment, the Hough transform unit 14 adds the contour intensity of a pixel in the contour image data 103 to the counts in the Hough table 15 after quantizing it with a resolution lower than the resolution of the pixel value.

FIG. 6 is a graph of the additional value relative to the contour intensity of a pixel according to the fifth embodiment. In this implementation, due to quantization, the contour intensities of pixels in the contour image data 103 are associated with four additional values.

More specifically, the pixel values of pixels of in contour image data 103 of 128 or less are associated with the additional value of 0. The pixel values of the pixels in the contour image data 103 not less than 129 and not more than 170 are associated with the additional value of 1. The pixel values of the pixels in the contour image data 103 of not less than 171 and not more than 212 are associated with the additional value of 2. The pixel values of the pixels in the contour image data 103 not less than 213 and not more than 255 are associated with the additional value of 3.

The detection unit 16 performs the operation shown in Equation 7 to calculate the comprehensive count V. C1($\theta$,$\rho$), C2($\theta$,$\rho$) and C3($\theta$,$\rho$) in Equation 7 are the same as those of the third embodiment. In Equation 7, Q represents a quantizing function.

[Equation 7]

$$V = \frac{1}{3}\{Q(C1(\theta, \rho)) + Q(C2(\theta, \rho)) + Q(C3(\theta, \rho))\} \quad (7)$$

The quantizing value Q(C1($\theta$,$\rho$)) in Equation 7 is stored in a first two-dimensional array T[$\theta$][$\rho$]. The quantizing value Q(C2($\theta$,$\rho$)) is stored in a second two-dimensional array T[$\theta$][$\rho$], and the quantizing value Q(C3($\theta$,$\rho$)) is stored in a third two-dimensional array T[$\theta$][$\rho$].

For an arc, the detection unit 16 performs the operation shown in Equation 8 to calculate the comprehensive count V. C1(a,b,r), C2(a,b,r) and C3(a,b,r) in Equation 8 are the same as those of the third embodiment. In Equation 8, Q represents a quantizing function.

[Equation 8]

$$V = \frac{1}{3}\{Q(C1(a, b, r)) + Q(C2(a, b, r)) + Q(C3(a, b, r))\} \quad (8)$$

The quantizing value Q(C1(a,b,r)) in Equation 8 is stored in a first three-dimensional array T[a][b][r]. The quantizing value Q(C2(a,b,r)) is stored in a second three-dimensional array T[a][b][r] and the quantizing value Q(C3(a,b,r)) is stored in a third three-dimensional array T[a][b][r].

The comprehensive count V may be determined by quantizing the counts C1, C2 and C3 and then averaging the quantized values. The detection unit 16 compares the comprehensive count V with a threshold for detecting a straight line, and detects a line segment. Or, it compares the comprehensive count V with a threshold for detecting an arc, and detects an arc. As compared with the third embodiment, the comprehensive count is quantized and thus the threshold may be set depending on the degree of quantization. The detection unit 16 outputs detection information regarding the line segment or arc.

Thus, in the present embodiment, the Hough transform is performed not only on a brightness image but also on a color-difference image, and the results are comprehensively evaluated to detect a line segment or arc. Further, in the present embodiment, a line segment or arc may be detected after weighting depending on the value of contour intensity. Further, compared with the third embodiment, the range of counts may be reduced to reduce the amount of computation.

In the implementation shown in FIG. 6, the additional value of 0 is assigned to the pixel values of 0 to 128, which means that a relatively large range compared with the entire range of pixel values is associated with the additional value of 0. This arrangement is intended to consider a point with a pixel value smaller than the half the maximum to be noise and does not consider it when detecting a line segment or arc. However, any manner of association may be used; for example, any range of pixel values may be assigned to any additional value. In the implementation of FIG. 6, pixel values are assigned to four additional values, i.e. 0 to 3, however, any number of additional values may be used. For example, if only a very sharp line segment or arc is to be detected to minimize effects of noise, the additional value of 0 may be assigned to the pixel values of 0 to 200 and the additional value of 1 may only be assigned to the pixel values of 201 or larger. These properties of quantization may be adjusted by the quantizing function Q.

Applying a process for detecting a line segment or arc according to the conventional Hough transform to embodiments of the present application would mean that the additional value of 0 is assigned to the pixel value of 0 and the additional value of 1 is assigned to the pixel values of 1 to 255. Conventional processes are susceptible to effects of noise since points of all densities are equally evaluated when the counts in the Hough table are provided. In contrast, in the present embodiment, the additional value is weighted depending on the density even for a pixel value in the range of 1 to 255. This makes it possible to reduce effects of noise and detect a line segment or arc with improved accuracy.

In the present embodiment, the counts C1, C2 and C3 that are quantized are stored in the first to third two-dimensional arrays or three-dimensional arrays. In other implementations, the Hough table 15 may have a single array and the quantized values may be stored in this single array. In such implementations, the detection unit 16 only has to divide the counts by 3. In still other implementations, the Hough table 15 may have a single array and store the quantized values divided by 3. In such implementations, the detection unit 16 only has to compare such values with a threshold.

Sixth Embodiment

Next, a sixth embodiment of the present invention will be described. The sixth embodiment is a variation of the fifth embodiment. In the fifth embodiment, the comprehensive counts of the third embodiment are quantized. In the sixth embodiment, the comprehensive counts of the fourth embodiment are quantized.

The detection unit 16 according to the sixth embodiment performs the operation shown in Equation 9 to calculate the comprehensive count V. $C1(\theta,\rho)$, $C2(\theta,\rho)$ and $C3(\theta,\rho)$, and k1, k2 and k3 in Equation 9 are the same as those of the fourth embodiment. Q represents a quantizing function.

[Equation 9]

$$V = k1*Q(C1(\theta,\rho)) + k2*Q(C2(\theta,\rho)) + k3*Q(C3(\theta,\rho)) \quad (9)$$

For an arc, the detection unit 16 performs the operation shown in Equation 10 to calculate the comprehensive count V. C1(a,b,r), C2(a,b,r) and C3(a,b,r), and k1, k2 and k3 in Equation 10 are the same as those of the fourth embodiment.

[Equation 10]

$$V = k1*Q(C1(a,b,r)) + k2*Q(C2(a,b,r)) + k3*Q(C3(a,b,r)) \quad (10)$$

The comprehensive count V may be determined by quantizing the counts C1, C2 and C3 and then weighting and summing the quantized values. The detection unit 16 compares the comprehensive count V with a threshold for detecting a straight line, and detects a line segment. Or, it compares the comprehensive count V with a threshold for detecting an arc, and detects an arc. The detection unit 16 outputs detection information regarding the line segment or arc.

In the present embodiment, the counts C1, C2 and C3 that are quantized are stored in the first to third two-dimensional arrays or three-dimensional arrays. In other implementations, the quantized values multiplied by a weighting value may be stored in such arrays. In such implementations, the detection unit 16 only has to sum the counts. In still other implementations, the Hough table 15 may have a single array and the quantized values that are weighted may be stored in this single array. In such implementations, the detection unit 16 only has to compare such values with a threshold.

Seventh Embodiment

Next, a seventh embodiment of the present invention will be described. The seventh embodiment is a variation of the fifth embodiment. In the fifth embodiment, the counts C1, C2 and C3 are quantized using the same quantizing function, as shown in Equations 7 or 8. In the seventh embodiment, the detection unit 16 quantizes the counts C1, C2 and C3 using different quantizing functions. Equation 11 shows how the comprehensive count V for detecting a line segment is calculated according to the seventh embodiment:

[Equation 11]

$$V = Q1(C1(\theta,\rho)) + Q2(C2(\theta,\rho)) + Q3(C3(\theta,\rho)) \quad (11)$$

In Equation 11, Q1, Q2 and Q3 represent quantizing functions. As shown in Equation 11, $C1(\theta,\rho)$ is quantized by the quantizing function Q1. $C2(\theta,\rho)$ is quantized by the quantizing function Q2, and $C3(\theta,\rho)$ is quantized by the quantizing function Q3. The comprehensive count V is calculated by summing the three counts that have been quantized by different quantizing functions.

Equation 12 shows how the comprehensive count V for detecting an arc is calculated. As shown in Equation 12, C1(a,b,r) is quantized by the quantizing function Q1. C2(a,b,r) is quantized by the quantizing function Q2, and C3(a,b,r) is quantized by the quantizing function Q3. The comprehensive count V is calculated by summing the three counts that have been quantized by different quantizing functions.

[Equation 12]

$$V = Q1(C1(a,b,r)) + Q2(C2(a,b,r)) + Q3(C3(a,b,r)) \quad (12)$$

Figure 8:
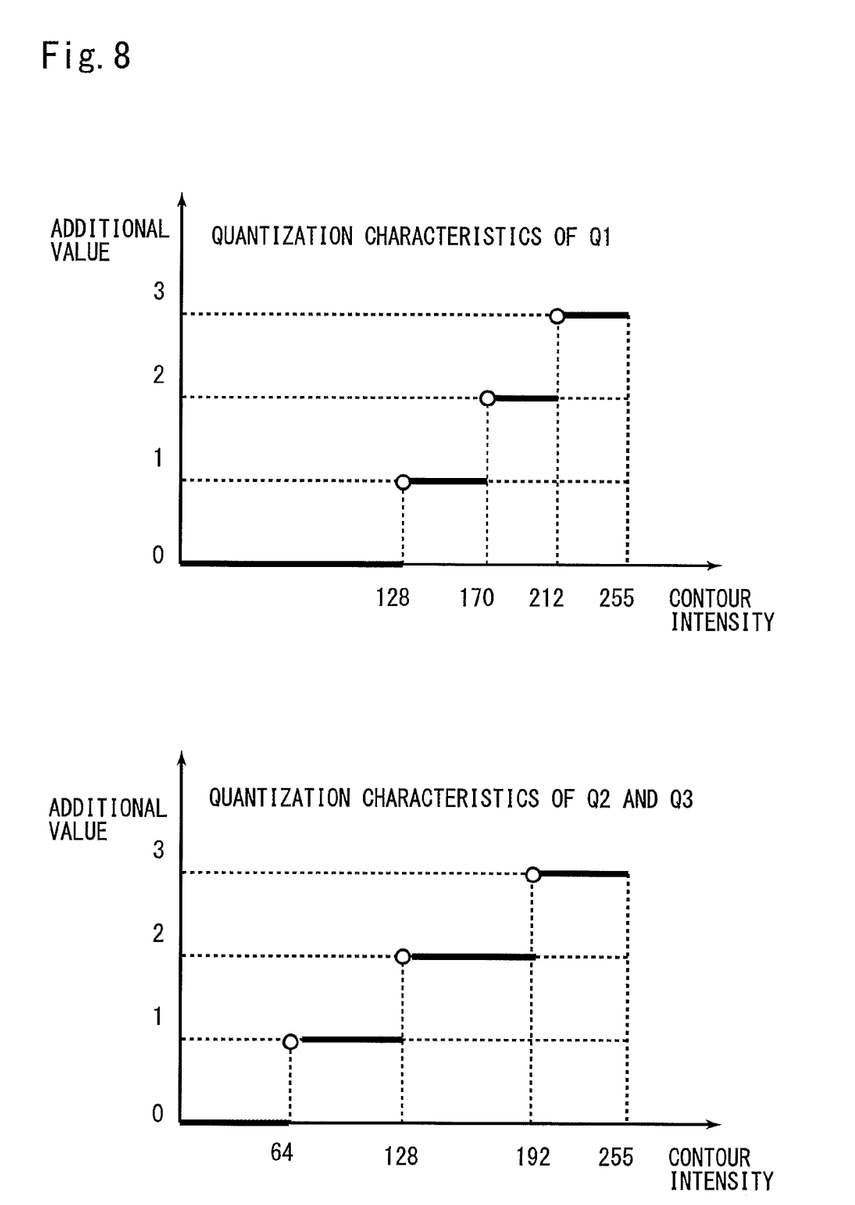
FIG. 8 illustrates the additional value relative to the pixel value (contour intensity) according to a seventh embodiment.

FIG. 8 illustrates examples of the quantizing functions Q1 to Q3. In these examples, the quantizing function Q1 for brightness data has different properties than the quantizing functions Q2 and Q3 for color-difference data. In the examples of FIG. 8, for contour data relating to a brightness image, the additional value of 0 is associated with the pixel values of 128 and less. For contour data relating to a color-difference image, the additional value of 1 is associated with the pixel values of 65 or more, even those not more than 128. That is, this arrangement is intended to highly evaluate changes in color when detecting a line segment or arc.

Thus, in the seventh embodiment, different quantizing functions are used for each component constituting an image in a color space. The counts are evaluated using different properties for different colors to achieve comprehensive evaluation. Further, concepts of the sixth embodiment may be incorporated into the seventh embodiment. That is, different quantizing functions may be used for the counts C1, C2 and C3 for quantization and the quantized values may be weighted.

{Variation}

In the first to seventh embodiments, the center of the contour image data 103 is represented by the origin and straight lines in the contour image data 103 are represented by θ and ρ; or, the value set of central coordinates (a,b) of an arc is determined with the center of the contour image data 103 represented by the origin. Alternatively, the origin may represent any location in the image. Still alternatively, the origin may represent a location outside the frame of the contour image data 103.

In the first to seventh embodiments, contour extraction is performed. Contour extraction is one example of a process for extracting a feature quantity of an image. The Hough transform may be performed after a feature quantity of an image is extracted by other methods. In such implementations, too, additional values for the counts in the Hough table may be determined with the feature quantities of an image taken into consideration.

While the present invention has been illustrated with reference to the embodiments shown in the attached drawings, the present invention is not limited by the detailed description unless specifically stated, and should be construed broadly as defined by the Claims.

The invention claimed is:

1. A detection apparatus for detecting an arc in a specified image, comprising:
   a feature quantity calculating part configured to determine a feature quantity of each point in the specified image;
   a Hough transform part configured to convert an arc that passes through an arbitrary point in the specified image to a value set of coordinates (a,b,r) in a Hough space by defining orthogonal coordinates with respect to a reference point in the specified image and representing an arbitrary arc in the specified image using a value set of coordinates (a, b) of its center in an orthogonal coordinate system and a radius r, and configured to perform the Hough transform using all points in the specified image whose pixel values each exceed zero;
   a counting part configured to add a value weighted by a feature quantity of a point in the specified image to a count value stored in a storage entry corresponding to a value set of coordinates (a,b,r) in the Hough space to which the point in the specified image is converted by the Hough transform part, each point in the specified image having an individual feature quantity which weights a particular value to be added to the count value corresponding to a value set of coordinates (a,b,r) in the Hough space to which the each point is converted by the Hough transform part; and
   a detection part configured to detect the arc in the specified image by identifying a value set of coordinates (a,b,r) for which the count value exceeds a first threshold.

2. The detection apparatus according to claim 1, wherein the feature quantity calculating part determines a contour intensity represented by the feature quantity of the point in the specified image by performing contour extraction.

3. The detection apparatus according to claim 2, wherein the counting part counts an additional value represented by the contour intensity of the point in the specified image after the contour extraction.

4. The detection apparatus according to claim 2, wherein the counting part quantizes and then counts the contour intensity of the point in the specified image after the contour extraction.

5. The detection apparatus according to claim 1, further comprising a brightness image generator configured to, when the specified image is a color image, generate a brightness image based on the color image prior to a Hough transform being performed.

6. A detection method for detecting an arc in a specified image, comprising:
   (a) determining a feature quantity of each point in the specified image;
   (b) converting an arc that passes through an arbitrary point in the specified image to a value set of coordinates (a,b,r) in a Hough space by defining orthogonal coordinates with respect to a reference point in the specified image and representing an arbitrary arc in the specified image using a value set of coordinates (a, b) of its center in an orthogonal coordinate system and a radius r, and performing the Hough transform using all points in the specified image whose pixel values each exceed zero;
   (c) adding a value weighted by a feature quantity of a point in the specified image to a count value stored in a storage entry corresponding to a value set of coordinates (a,b,r) in the Hough space to which the point in the specified image is converted by the step (b), each point in the specified image having an individual feature quantity which weights a particular value to be added to the count value corresponding to a value set of coordinates (a,b,r) in the Hough space to which the each point is converted by the step (b); and
   (d) detecting the arc in the specified image by identifying a value set of coordinates (a,b,r) for which the count value exceeds a first threshold.

7. A detection apparatus for detecting an arc in a specified image in a color space, comprising:
   a generating part configured to generate from the specified image a plurality of component images in the color space;
   a feature quantity calculating part configured to determine a feature quantity of each point in each component image;
   a Hough transform part configured to convert an arc that passes through an arbitrary point in each component image to a value set of coordinates (a,b,r) in a Hough space by defining orthogonal coordinates with respect to a reference point in each component image and representing an arbitrary arc in each component image using a value set of coordinates (a, b) of its center in an orthogonal coordinate system and a radius r, and configured to perform the Hough transform using all points in the specified image whose pixel values each exceed zero;
   a counting part configured to sum a value weighted by a feature quantity of a point in each component image to a count value stored in a storage entry corresponding to a value set of coordinates (a,b,r) in the Hough space to which the point in each component image is converted by the Hough transform part, each point in each component image having an individual feature quantity which weights a particular value to be added to the count value corresponding to a value set of coordinates (a,b,r) in the Hough space to which the each point is converted by the Hough transform part;
   a comprehensive counting part configured to comprehensively evaluate the count values for all component images to determine a comprehensive count value; and
   a detection part configured to detect the arc in the specified image by identifying a value set of coordinates (a,b,r) for which the comprehensive count value exceeds a first threshold.

8. The detection apparatus according to claim 7, wherein the feature quantity calculating part determines a contour intensity represented by the feature quantity of the point in each component image by performing contour extraction.

9. The detection apparatus according to claim 8, wherein the counting part counts an additional value represented by the contour intensity of the point in each component image after the contour extraction.

10. The detection apparatus according to claim 8, wherein the counting part quantizes and then counts the contour intensity of the point in each component image after the contour extraction.

11. The detection apparatus according to claim 10, wherein the counting part quantizes contour intensities for different component images using different quantizing functions.

12. The detection apparatus according to claim 7, wherein the comprehensive counting part determines the comprehensive count by weighting and summing the counts of the component images.

13. A detection method for detecting an arc in a specified image in a color space, comprising:
- (a) generating from the specified image a plurality of component images in the color space;
- (b) determining a feature quantity of each point in each component image;
- (c) converting an arc that passes through an arbitrary point in each component image to a value set of coordinates (a,b,r) in a Hough space by defining orthogonal coordinates with respect to a reference point in each component image and representing an arbitrary arc in each component image using a value set of coordinates (a, b) of its center in an orthogonal coordinate system and a radius r, and performing the Hough transform using all points in the specified image whose pixel values each exceed zero;
- (d) adding a value weighted by a feature quantity of a point in each component image to a count value stored in a storage entry corresponding to a value set of coordinates (a,b,r) in the Hough space to which the point in each component image is converted by the step (c), each point in each component image having an individual feature quantity which weights a particular value to be added to the count value corresponding to a value set of coordinates (a,b,r) in the Hough space to which the each point is converted by the step (c);
- (e) comprehensively evaluating the count values for all component images to determine a comprehensive count value; and
- (f) detecting the arc in the specified image by identifying a value set of coordinates (a,b,r) for which the comprehensive count value exceeds a first threshold.

* * * * *